United States Patent [19]

DeAngelis

[11] Patent Number: 4,654,482

[45] Date of Patent: Mar. 31, 1987

[54] HOME MERCHANDISE ORDERING TELECOMMUNICATIONS TERMINAL

[76] Inventor: Lawrence J. DeAngelis, 3200 N. Lake Shore Dr., Chicago, Ill. 60657

[21] Appl. No.: 796,077

[22] Filed: Nov. 7, 1984

Related U.S. Application Data

[63] Continuation-in-part of Ser. No. 660,936, Oct. 15, 1984, abandoned.

[51] Int. Cl.⁴ .......................................... H04M 11/00
[52] U.S. Cl. ........................................ 379/95; 379/91
[58] Field of Search ................ 179/2 A, 2 CA, 2 DP, 179/90 BD, 90 CS

[56] References Cited

U.S. PATENT DOCUMENTS

| | | | |
|---|---|---|---|
| 3,700,814 | 10/1972 | Spraker | 179/90 CS X |
| 3,735,350 | 5/1973 | Lemelson | 179/90 BD X |
| 3,938,090 | 2/1976 | Borison et al. | 179/2 CA |
| 4,071,697 | 1/1978 | Bushnell et al. | |
| 4,071,698 | 1/1978 | Barger, Jr. et al. | 179/2 A X |
| 4,107,467 | 8/1978 | Johnson et al. | 179/2 DP |
| 4,201,887 | 5/1980 | Burns | 179/2 DP |
| 4,223,183 | 9/1980 | Peters, Jr. | 179/2 DP |
| 4,434,326 | 2/1984 | Koelk et al. | 179/2 DP |
| 4,503,288 | 3/1985 | Kessler | 179/2 DP |

FOREIGN PATENT DOCUMENTS 3011511 10/1981 Fed. Rep. of Germany ........ 179/90 BD
2063010 5/1981 United Kingdom ........... 179/90 CS

OTHER PUBLICATIONS

A. Turbat, "Telepayment and Electronic Money, The Smart Card", *Communication & Transmission*, Pub. by Sotelec, Paris, Dec. 1982, pp. 11-20.

Primary Examiner—Keith E. George
Attorney, Agent, or Firm—Robert E. Wagner; Lawrence J. Bassuk

[57] ABSTRACT

A terminal provides for ordering merchandise from any one of a plurality of merchants over the direct distance dial telephone network while remaining at home. Printed merchandise codes are electronically read by a wand of a bar code reader that is passed thereacross, automating data entry. Separate or integral memory cartridges carry a set of recognition data for each merchant order receiving device, the recognition data being required to validate the entry of an order in an order receiving device. A liquid crystal character display, indicator lights and user actuated switches provided for guiding a user through the ordering sequence for each merchant.

20 Claims, 2 Drawing Figures

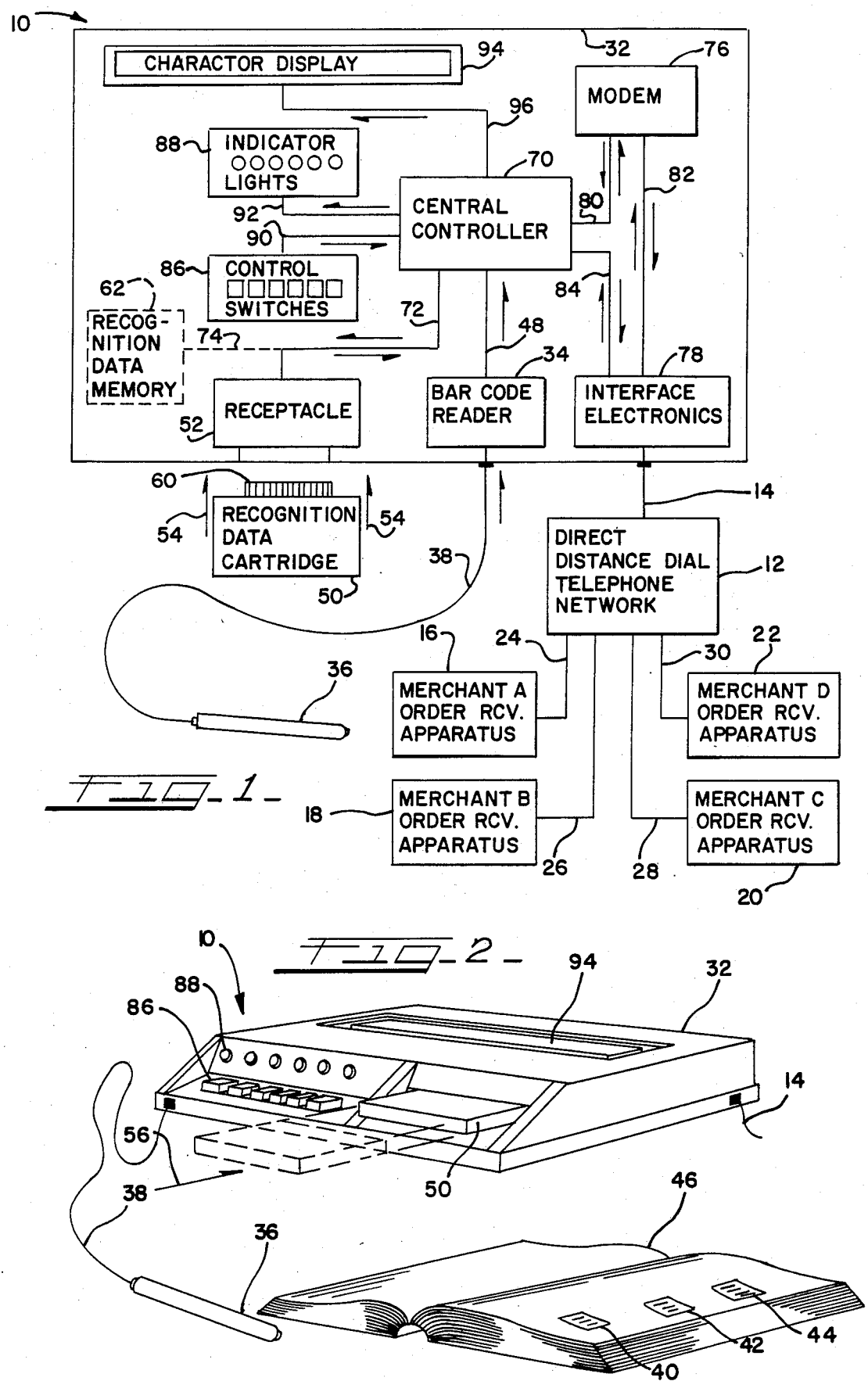

form

HOME MERCHANDISE ORDERING TELECOMMUNICATIONS TERMINAL

CROSS-REFERENCE TO RELATED APLICATION

This application is a continuation-in-part of application Ser. No. 660,936filed Oct, 15, 1984 now abandoned.

BACKGROUND OF THE INVENTION

This invention relates generally to electronic communication terminals and particularly relates to electronic communication terminals that can be connected to the direct distance dial telephone network for communication with order receiving apparatus of any one of plural merchants.

Buying consumer goods, shoes, shirts, milk and bread, typically has occurred in different retail stores carrying the desired merchandise. A person drives or walks to each store, selects the brand, type and size shoes or shirt, etc., stands in line at the cash register and then drives or walks home. Many stores for basic human needs, such as food and clothes, are distributed among residential areas for convenience of the buyers. Specialty stores and large department stores often are centered in large shopping centers, which typically are less convenient to travel to, but the grouping of several stores offsets this inconvenience.

Catalog shopping alleviates the need for the buyer to leave his or her home and is effected by the different merchants mailing their printed catalogs to individual households. The individuals then can place their order in writing by mail or orally over the telephone. The national direct distance dialing telephone network is a great advantage in this latter regard because it enables specialty stores to mail catalogs to particular households across the country and receive telephone orders orally quickly and with the least amount of effort of the buyers.

The development of large complex electronic stock control and ordering devices has substantially increased the efficiency of stores re-ordering goods from manufacturers and distributors, but until now, these efficiencies were unavailable to the general buying public. One of the problems has been the absence of an easy to operate device or process, having a low cost, that can convey to many different stores the information unique to the desired goods or merchandise in a form acceptable to each store. Further, such a device or process must include confidential recognition data to insure the security of received orders, i.e. that the indicated person actually ordered the goods or merchandise, that the correct credit account or bank checking account is charged, etc. Such a device and process can be extremely helpful to people who are incapacitated and have trouble traveling to stores, to people who live in high crime areas where it is dangerous to travel and to people who live in high rise buildings and desire the convenience of doing their basic goods shopping from their apartment.

Such a device or process must automatically perform any complicated data entry procedure or step, such as entering a merchandise code, a merchant's security code etc. This simplifies and increases the accuracy of the device or process so that it can be used effectively by the general public. A complicated order entry process could not be performed by many elderly or incapacitated people and would be frustrating and inaccurate to most people, especially busy people who have little time to learn complex data entry systems. Moreover, having to learn a different manual ordering procedure or sequence for each different store would effectively prevent the usage of such a device or system by the general public.

Fortunately, some of the differences between stores already has been removed by the introduction of the universal product codes (UPC) in the form of spaced black bars printed on a white background. These codes are believed most prevalent on foods and have enabled the use of electronic check-out counters in food stores. The purchase of foods is one primary application of the device and process of the invention.

SUMMARY OF THE INVENTION

In accordance with the invention, an automated electronic ordering telecommunications terminal or device provides for ordering goods or merchandise of any one of several merchants from the home and over the direct distance dial telephone network. The goods to be ordered are illustrated on printed materials such as catalogs, newspaper inserts and other advertisements delivered to the home, usually by mail. Next to the description for each item of goods is a merchandise code, for example a universal product bar code, that is machine readable.

The ordering device has a hand held wand that is passed over or across the merchandise code corresponding to the desired item sought to be purchased to record the information required for ordering the selected item. The ordering device also includes a storage element, such as a plug-in cartridge or an integral electronic component that carries the telephone number, formatting information and security codes, all referred to as recognition data, of the desired merchant's order receiving apparatus or computer. The storage element also has space for temporarily storing the product ordering information.

A person effects the transmittal of the order, represented by the recorded information recognized by the wand, when desired by simply depressing control buttons located on the device cabinet. A one line display of text characters on the cabinet directs the user to depress the correct buttons to effect the desired transactions. Indicator lights also on the cabinet indicate the operation of the device.

In the preferred embodiment, the device includes a microprocessor based central controller having a program fixed in a read only memory (ROM). The storage element includes both ROM for the recognition data and random access memory (RAM) for the temporary order information for subsequent transmittal to the merchant's apparatus. The wand can be part of a commercially available bar code reader that readily connects to the controller. Connecting and interfacing the device to the switched telephone network is the function of an included modem, also commercially available.

Other advantages and features of the invention will become apparent upon making reference to the specification, claims, and drawings to follow.

BRIEF DESCRIPTION OF THE DRAWING

FIG. 1 is a block diagram of a telecommunications terminal or ordering device according to the invention connected to order receiving apparatus of several different merchants through a direct distance dial telephone network; and FIG. 2 is a perspective view of said device and a catalog carrying printed machine readable merchandise codes.

DESCRIPTION OF THE PREFERRED EMBODIMENT

A home, electronic telecommunications terminal or merchandise ordering device is indicated generally in FIGS. 1 and 2 by the reference character 10. In FIG. 1, device 10 is electrically connected to the local, national and international telephone network or direct distance dial (DDD) telephone network 12 by telephone line 14. Through DDD network 12, device 10 can be connected to any other telephone number desired and equipment connected thereto, for example, the order receiving apparatus 16, 18, 20 and 22 respectively of merchants A, B, C and D over telephone lines 24, 26, 28 and 30. Device 10 thus can establish a telephone communication link to the corner drug store as simply as to an outdoor specialty goods store across the nation.

Device 10, referring also to FIG. 2, comprises a cabinet 32 enclosing several subassemblies including a bar code reader 34. Reader 34 is such as a commercially available sub-assembly and has a hand movable sensor in the form of a wand 36 at the remote end of a flexible cable 38. Alternatively, the sensor of reader 34 can be desk submerged or panel implanted and cable 38 can be replaced with a suitable radio transmitter and receiver in the wand 36 and device 10, respectively.

The sensor of wand 36 is intended to be passed across or over printed machine readable codes such as universal product codes 40, 42 and 44 in catalog 46. Each product code 40, 42 and 44 indicates, in the form of black bars on a white background, the numerical identification corresponding to one particular piece of goods or merchandise sold by the merchant who printed and distributed catalog 46. Bar code reader 34 operates to convert the printed product codes, sensed by wand 36 being passed thereover, into electrical merchandise code signals that are presented on leads 48.

Of course, product codes 40. 42 and 44 can be printed on other types of publications such as inserts for magazines and newspapers, the newspapers and magazines themselves, mailers, etc., and on an actual product to be reordered.

Wand 36 can consist of a plastic pencil-shaped device that houses a light-emitting diode (LED), a photo-sensitive diode (PHD) and a lens through which the light emitted by the LED passes. The light is directed onto the surface on which the bar code 40, 42 and 44 is printed and is then reflected back through the lens and to the PHD. The light from the light-emitting diode can pass through the lens at an angle. These parts are conventional and are not specifically illustrated.

Wand 36 is connected by the suitably highly flexible conductor cable 38 to the decoding-encoding electronics of reader 34 that performs a translation function. Reader 34 includes integrated circuits and a microprocessor that receive an analog electrical signal generated by the wand 36 and converts it into a digital electronic signal that can be fed to any suitable computer. Included in reader 34 can be an amplifier and a signal shaping circuit.

Reader 34 receives the signal from the wand 36, which is an analog signal corresponding to the widths of the bars in the printed bar code, and converts the signals to binary data signals having counts corresponding to the widths of successive reflecting and non-reflecting sections of the bar code. These counts are temporarily stored until the entire series of signals for one complete code (one item) is received; then the reader electronics compares the counts with its table of valid codes. If a match is made, the code is accepted, a signal is sent to an audible tone producing device (not shown) to indicate the proper reading of the code, and the data represented by the code is recorded as a selected item.

Device 10 further includes a recognition data cartridge 50 that can be inserted, in the direction indicated by arrows 54 and 56, into a receptacle 52 for electrical connection to leads 60. Cartridge 50 can contain data concerning: the customer's account number; the name, telephone number and other information of the merchant; the type of bar code the merchant uses and security codes necessary to communicate with the order receiving apparatus, such as apparatus 16, 18, 20 and 22, of each desired merchant. The cartridges can be obtained from each merchant directly or from a distributor. There can be one such cartridge for each merchant who allows the selected customer to order merchandise with device 10, there can be one such cartridge for all of the merchants, or there can be one such cartridge for each group of selected ones of the merchants.

In any event, cartridge 50 can include a sealed plastic case enclosing a desired type of memory storage element such as a non-volatile random access memory (NVRAM) component, a battery power supply (BPS) mounted back to back with the NVRAM or otherwise connected thereto, one or more circuit boards carrying the memory element and battery, and an identifying label (not shown). If desired, leads 60 can be carried by an edge of the circuit card protruding from the case of cartridge 50.

Alternatively, the recognition data can be carried in a recognition data ROM 62 that functionally and physically replaces cartridge 50 and receptacle 52. ROM 62 is fixed in device 10 for removal or replacement by a serviceman, as desired. Cartridge 50 or ROM 62 can include portions in which the electrical merchandise code signals from reader 34 can be temporarily stored as they are sensed.

A central controller 70 receives the merchandise control signals from reader 34 on leads 48 and the recognition data signals from cartridge 50 and receptacle 52 on leads 72, or alternatively from ROM 62, on leads 74. Controller 70 operates to establish a telephone communications link from device 10 to a selected order receiving apparatus 16, 18, 20 or 22, place a desired order therewith and generally care for automatic operation of the device 10 with a minimal amount of effort and action from the user. To this end, controller 70 comprises: a microprocessor such as a TMS 7000 CMOS integrated circuit; fixed memory such as a mask programmed ROM carrying the operating program for the device 10; temporary storage memory such as RAM used for holding an item selection list, data received from the order receiving apparatus and other temporary data such as count sequences from the reader 34; and other related support logic such as counters and modem connection logic such as a universal asynchronous receiver/transmitter (UART) integrated circuit.

Alternatively but less advantageously, controller 70 can be implemented in discrete components to achieve the functions desired and described herein.

Controller 70 establishes a telephone communications link through a modem 76 and interface electronics 78, both internal of cabinet 32 over leads 80, 82 and 84. Modem 76 is a telecommunications device that transmits and receives serial binary data over the DDD telephone network using frequency-shift-keyed (FSK) modulation. Modem 76 can be compatible with the Bell 103 series data sets and can communicate at a rate of 300 bits per second. Modem 76 can provide all the necessary modulation, demodulation and filtering required to carry out a serial, asynchronous communications link. Leads 80, 82 and 84 carry between the controller 70, modem 76 and interface electronics 78 all necessary control and information signals to send and receive data over the communications link. Interface electronics 78 can contain components to fulfill a complete electronic telephone with auto-dialing, call-waiting report, busy signal and optional keyboard interface. This is well known.

Control switches 86 and indicator lights 88 are connected to controller 70 by leads 90 and 92 and are used respectively to control and indicate the status of the operation of device 10. Switches 86 can include one power on/off switch and five (5) momentary contact switches. The momentary contact switches can be connected to individual flip-flop circuits having outputs that are carried over leads 90 for monitoring by controller 70. Switches 86 can have the following designations:

(1) ON/OFF;
(2) SELECT;
(3) END;
(4) SEND;
(5) NO; and
(6) YES.

Lights 17 are lighted and extinguished by control of controller 70 over leads 92 by known circuits and can have the following designation and significance as follows:

L1: POWER ON
L2: PROCEED (Green)
L3: WAIT (Red)
L4: SELECTION ACKNOWLEDGED
L5: NO (Red)
L6: YES (Green)

Other control switches and indicator lights are possible, as desired.

Character display 94, connected to controller 70 by leads 96, displays text messages to the operator describing the status of the device and actions required to be performed by the operator to advance the ordering process. These message could be as simple as a "HELLO" when power is first applied to the device, or a command to use the wand or depress a button.

Display 19 preferably is a liquid crystal alphanumeric display module or modules providing one line of thirty-two (32) characters. More or less character display can be provided as desired. A 5×7 dot matrix or other matrix arrangement can be used for each character to provide upper and lower case letters, numbers, symbols and punctuation. Such commercially available displays include such as a CMOS very large scale integration (VLSI) microprocessor, character memory RAM, character generation RAM and ROM, and refresh, control and timing signals.

Device 10 can operate as follows:

Power to the device is applied by activating the ON/OFF switch. The ON/OFF and PROCEED lights are lit and the following sign-on message will appear on the display:

"*To Start, Press SELECT*"

The user then presses the SELECT button. Nothing whatever will happen if the user presses any other button except the ON/OFF button, in which case power to the circuit will merely be disconnected. If the SELECT button is pressed, the user is given three (3) options that are indicated on the display:

"SELECT to (Shop); SEND to (Order); or END"

If the SELECT button is pressed again by the user, the WAIT light will come on, the display will state: "Insert Cartridge and Press the YES Key", and the WAIT light will go off and the PROCEED, NO and YES lights will come on to await the user's response. If the YES button is then pressed, the cartridge 50 inserted in receptacle 52, will be examined by controller 70 and the display will state: "(MERCHANT'S NAME) Cartridge (YES or NO)". If the user has inserted the correct cartridge (that is the cartridge properly identifying the merchant from whom the user desires to order goods), the user will confirm the selection to the system by pressing the YES button and the system will read the unique encoding scheme for the particular merchant off the cartridge and set the device procedures to enable the user to select the items that he wants. When this process is completed the NO and YES lights will go off, the PROCEED light will stay on and the display will state: "Please Make Your Selections; END to Quit."

Alternatively, a fixed ROM 62 can be used rather than a plurality of cartridges. If a fixed memory is used, the identity of a merchant with whom an order is to be placed (and, if desired, other data concerning the merchant) are supplied to controller 70 by passing wand 36 over one or more sets of bar code indicia that identify such merchant and, if desired, provide other such data. If it is then desired to contact a different merchant, wand 36 can be passed over bar code indicia associated with such different merchant and thereby data relating to such different merchant can be introduced into controller 70. This data can take the place of the data previously contained therein relating to the first merchant or can be contained in the memory in addition to the data relating to the first merchant. In such an embodiment the user can store in ROM 62 data associated with each of several merchants, including a list of items to be ordered from each.

Controller 70 will then cause a file to be opened in an append mode (so all selections do not have to be made at one time) on the cartridge and the system will then be ready to receive data from wand 36. The same displayed message will stay on through the entire selection mode.

Each item is selected by passing the wand 36 over bar code indicia, such as indicia 40, 42 and 44, printed on an item taken from a counter or shelf by the user or printed on a sheet supplied to the user by the merchant or otherwise obtained by the user. Such a sheet can be a sheet in an advertising brochure or can be a page in catalog 46. Thus each bar code is "associated" with the corresponding merchandise item whether printed on the item itself or in connection with some representation of the item such as a name, title, symbol or picture.

As each item is selected, the SELECTION ACKNOWLEDGED light will blink and a buzzer will sound to acknowledge that a valid reading has been made and that data identifying the designated item selected is recorded in the cartridge or in controller 70. In effect, then, the cartridge will simply store the identification of an item or a number of items that the user may wish to order at a later time. When the selection process is completed, the user will so indicate by pressing the END button. The WAIT, NO and YES lights will then come on and the display will state: "To Confirm Please Press the YES Button." The user can then press any button other than the YES button and if so, the device responds as if the NO button were pressed, reestablishing the SELECT mode. If the user presses the YES button, the selection file is closed and the display states "End of Item Selection for 'STORE NAME',". The device disables any input from the wand 36, turns off all lights except ON/OFF and SELECT and displays the Sign-On Message.

In a non-preferred embodiment, the SEND process described below can take place automatically immediately after each selection is made.

When the SELECT button has been pressed and the corresponding message displayed, the user can press the SEND button rather than the SELECT button or the END button. If the SEND button is pressed, the WAIT light will come on and the display will state: "Insert Cartridge and Press the YES Key". The NO and YES lights will then come on to await the user's response. The YES key can then be pressed and if it is, the cartridge will be examined by controller 70 and the display will state: "(MERCHANT'S NAME) Cartridge (YES or NO)". If the user is then satisfied that he has inserted the correct cartridge, user can confirm the selection by pressing the YES button. Then the interface electronics 78 will place a call to such as Merchant A's order receiving apparatus 16 through modem 76 according to the telephone number in the cartridge 50. If the lines are busy, it can continue to call and call again until a connection is made. When a connection is made, the merchant's apparatus 16 will know who is calling by requesting and receiving the customer I.D. number off the cartridge and check to see if the cartridge has been reported stolen or lost. The method of payment can be checked with the merchant's records and if the user is a charge account customer, user's credit limit can be checked. If user usually pays by check (Electronic Banking), it can check user's bank balance. If the merchant's apparatus 16, usually a large computer, has received no negative information concerning user in the checks thus made, apparatus 16 will be enabled to record user's order and the display 94 will state: "Verification Mode: YES=Start * NO=Abort". The WAIT light will go off and the PROCEED, NO and YES lights will come on. If user then presses the YES button, the display will display for a moment: "** Press YES to Order/NO to Reject **". The items that the user has previously selected are then transmitted over the telephone communications link to apparatus 16 and are compared against its data base. Starting with the first item in the list of selections on user's cartridge, the description of this item, along with "today's" price (the current price) may be shown on display 94. The apparatus 16 then waits for user's response (Yes or No). If user's response is No, as may be indicated by pressing the NO button or otherwise, the display can show: "* Your Rejection of This Item is Acknowledged *". If user's response is "YES", as indicated by his pressing the YES button or otherwise, the display will state "Your Selection is Acknowledged and Ordered." This process is continued until the last item in the list of selections has been verified.

The display states: "Shall This Order be Delivered? YES or NO." If user responds with a NO, by pressing the NO button or otherwise, the display will show the address where user can pick up the merchandise. If user's response is YES, as indicated by pressing the YES button or otherwise, the merchant's apparatus 16 will know the user's address from information supplied by the merchant's customer records and will include the appropriate information in the order. The display will then be caused to display the total amount of user's order and any delivery charge, if applicable. After a few moments, the display will show a "thank you" message. The controller 70 then will erase the file on user's cartridge 50 that contained items that user selected so the next time user makes selections from this merchant user starts with an empty file in the cartridge. Controller 70 also closes the order file, instructs merchant's apparatus to disconnect itself from the telephone system, disconnects device 10 from the telephone system, turns off all the lights except POWER ON and PROCEED and displays the Sign-On Message.

Inputs to the device 10 and more particularly to controller 70 can be by means other than closing one of switches 86. Other methods of providing inputs include voice actuation and screen-touch switching. Thus, the switches 86 can be replaced with switches which are actuated in response to the detection by a sensor of voice signals that are determined to be equivalent to YES or NO, to accomplish suitable operation of the method of the invention. Also, devices comprising computer display screens are available in which switching takes place in response to touching of the display screen by a user's finger; such a device may be used to provide switching in device 10. Further, in places of switches 86, other than the ON/OFF switch, there may be provided a plurality of bar code indicia such that each set or group of such indicia corresponds to a function to be enabled by closing a switch. The controller 70 can be programmed to enable each such function when wand 36 is passed over the corresponding bar code indicia.

If user presses the END button while in the Select Mode, the display will show: "To Confirm Please Press the YES Button". The NO and YES lights then will come on. If user's response is Yes, as indicated by pressing the YES button, or otherwise, the system controller 70 may then close the selection file, disable any input from wand 36 and go back to displaying the Sign-On Message. If user's response is a NO, the process will then resume as usual.

If the user presses the END button while in the Send Mode, the display will show: "To Confirm Please Press the YES button", and the NO and YES light will come on. If user's response is then Yes, the display will show: "**ORDER ABORTED AND NOT ENTERED**". This causes the file in apparatus 16 to be closed, apparatus 16 to be disconnected from the device and the display to show the Sign-On Message. The selected file in the cartridge will remain intact. If the user's response is NO, the ordering process will resume as usual.

The device of the invention has been described as an "ordering device" and its operation to order merchandise from a vendor has been described. The word "order" has many definitions. Among these, "order" when used as a transitive verb may mean "to give instructions for; issue a command for" or, when used as a noun, may mean "a written commission or instruction to supply, purchase or sell something": (Funk and Wagnalls' "College Standard Dictionary", p. 798; 1943, Wilcox and Follett, Chicago, Ill.)

In accordance with these definitions, the term "ordering" is used herein as a verb to mean "the act of providing to one who is to act on or respond to an order, such commission or instruction" (which may of course be reduced to writing by a printer attached to merchant's apparatus 16).

Beyond use in a home for ordering consumer goods and merchandise, device 10 of the invention can find utility in other applications such as a small retail store that needs to order resupply of goods or merchandise from any one of several distributors or manufacturers.

In every instance in which a "merchant" is referred to in connection with the invention, the merchant is considered to be one who has available an apparatus comprising such as a main-frame computer with the ability to receive and initiate many telephone calls simultaneously at a suitable location.

The process of the invention can be thought of as involving the steps of generating bar code or electrical merchandise code signals, establishing a telephone communications link with a distant order receiving apparatus of a desired merchant, and conveying the merchandise code signals to be desired merchant in conjunction with stored recognition data individual to that merchant.

In an alternative embodiment, lights 88 can be omitted.

This statement should be amplified with the explanation that these lights serve as supplementary indicators to the user. Display 94 provides a first or primary indication to the user of the status of the device and of either the results of the previous step taken by the user or the next step or steps which are to be taken by the user. The lights 86 serve as a secondary indication to the user of the status of the device and of steps taken or to be taken, thereby augmenting or supplementing the indications provided to the user by display 94. Thus, rather than omitting all of the lights, only one or more might be omitted and, as an alternative, one or more additional indicator lights might be provided.

Switches 88 are described as being of a certain number and having certain designated functions. The number of functions may be reduced and thereby the number of switches reduced without departing from the invention, although the alternatives thus provided to user may be narrowed. For example, the ON/OFF switch may be omitted in which case closing the SELECT switch might also turn on power to the device. Then either pressing the END switch or non-use of the device for a certain period of time, say 15 minutes, could cause power to the device to be turned off.

It may be repeated that in place of manually operated switches there may be provided voice-activated swtiches or switches activated by finger touch of the display screen. Switching might also be accomplished in response to passing the wand 36 over a printed code that represents the desired function.

When separate cartridges 50 are used, it is essential to proper functioning of the device that a non-volatile memory be provided in each cartridge. If no cartridges are used, then the memory 62 must be provided alternatively to serve the function of storage in each cartridge.

Alternatively, data storage can be provided in either tape or disk form. Thus each cartridge could contain a magnetic tape and be of any one of the well-known structures and configurations utilized with tape recorders. Or, if no cartridges are used, such a tape, with its necessary reels, drive, magnetic head and associated electronics might be provided within device 10. If tape cartridges are used, the apparatus normally provided in a tape recorder-player would need to be provided within device 10. A floppy disk or even a hard disk, with its associated drive, might be provided in each cartridge, or if no cartridges are used, then in device 10, to provide the necessary non-volatile memory.

The use of either tape or disk or any other means involving mechanical parts or elements for providing the needed non-volatile memory is alternative, particularly in view of the fact that the necessary memory can be provided in discrete integrated circuit form. A suitable component could be a bubble circuit or an EPROM or a battery-backed RAM. The latter is an integrated circuit having a small battery permanently attached thereto which provides power to maintain the data.

There are several principal codes used as bar codes. The method of the invention and the apparatus for carrying out the method are compatible with these codes and with other codes less well known. Equivalents may be utilized.

Thus, the present invention may be embodied in other specific forms without departing from the spirit or essential attributes thereof and accordingly reference should be made to the appended claims rather than to the foregoing specifications as indicating the scope of the invention.

I claim:

1. A terminal for ordering merchandise through a direct distance dial telephone network from any one of a plurality of merchants each having an order receiving apparatus that can be accessed through said direct distance dial telephone network, the merchandise being identified by individual printed merchandise codes in a catalog of printed merchandise codes and the order receiving apparatus of each merchant requiring its own set of recognition data to accept an order from the terminal, said terminal comprising:
   A. code reader means for producing electrical merchandise code signals in response to the code reader means recognizing a selected printed merchandise code;
   B. modem means adapted to be connected to said direct distance dial telephone network for establishing a telephone communication link with a desired one of said merchant order receiving apparatus;
   C. storage means containing at least one set of recognition data for each said desired one merchant order receiving apparatus; and
   D. control means for conveying said electrical merchandise code signals to said desired one merchant order receiving apparatus over said telephone communication link in conjunction with said at least one set of recognition data.

2. The terminal of claim 1 in which said storage means include a separate recognition data cartridqe containing said at least one set of recognition data for said desired merchant order receiving apparatus.

3. The terminal of claim 2 in which there are plural sets of recognition data for plural order receiving apparatus.

4. The terminal of claim 1 which said storage means include an integral recognition data memory containing said at least one set of recognition data for said desired merchant order receiving apparatus.

5. The terminal of claim 4 in which there are plural sets of recognition data for plural order receiving apparatus.

6. The terminal of claim 1 including user communication means coupled to said control means for guiding a user through a sequence of steps required to effect a valid receipt of a merchandise order in a merchant order receiving apparatus, said user communication means including display means for providing visual instructions to said user and switch means receiving instructions from said user.

7. The terminal of claim 6 which said display means include a plural character display.

8. The terminal of claim 6 in which said display means include plural indicator lights.

9. The terminal of claim 6 in which said switch means include plural finger actuated switches.

10. The terminal of claim 1 in which said code reader means include a wand adapted to be manually moved across a printed merchandise code.

11. A process for ordering merchandise from a terminal through a direct distance dial telephone network from any one of a plurality of merchants each having an order receiving apparatus that can be accessed through said direct distance dial telephone neetwork, the merchandise being identified by individual printed merchandise codes from a catalog of printed merchandise codes and the order receiving apparatus of each merchant requiring its own set of recognition data to validate an order from the terminal, said process comprising:

A. producing electrical merchandise code signals in response to a code reader being passed across a selected printed merchandise code;

B. establishing a telephone communication line with a desired one of said merchant order receiving apparatus through said direct distance dial telephone network;

C. storing at least one set of recognition data for each said desired one merchant order receiving apparatus; and D. conveying said electrical merchandise code signals to said desired one merchant order receiving apparatus over said telephone communication line in conjuction with said at least one set of recognition data.

12. The method of claim 11 in which said storing includes storing said separate recognition data in a removable cartridge.

13. The method of claim 12 in which said storing includes storing plural sets of recognition data for plural order receiving apparatus.

14. The method of claim 11 in which said storing includes storing said separate recognition data integrally with said device.

15. The method of claim 14 in which said storing includes storing plural sets of recognition data for plural order receiving apparatus.

16. The method of claim 11 including guiding a user through a sequence of steps required to effect a valid receipt of a merchandise order in a merchant order receiving apparatus, including providing visual instructions to said user and receiving instructions from said user.

17. The method of claim 16 in which providing said visual instructions includes forming visually perceivable characters.

18. The method of claim 17 in which providing said visual instructions includes lighting indicator lights.

19. The method of claim 16 in which receiving said instructions includes sensing the closure of switch contacts.

20. The method of claim 11 in which said producing electrical merchandise code signals includes passing a wand of a code reader across an individual printed merchandise code.

* * * * *